United States Patent [19]

Kaakinen

[11] Patent Number: 5,572,907
[45] Date of Patent: Nov. 12, 1996

[54] ACTUATOR ASSEMBLY IN HANDLE-BAR

[76] Inventor: Pekka Kaakinen, Järvikatu 8-10 G, FIN-33710 Tampere, Finland

[21] Appl. No.: 307,630
[22] PCT Filed: Mar. 22, 1993
[86] PCT No.: PCT/FI93/00106
  § 371 Date: Sep. 20, 1994
  § 102(e) Date: Sep. 20, 1994
[87] PCT Pub. No.: WO93/19309
  PCT Pub. Date: Sep. 30, 1993

[30] Foreign Application Priority Data

Mar. 23, 1992 [FI] Finland .................... 921244

[51] Int. Cl.⁶ .................... B62K 23/04; F16H 25/22
[52] U.S. Cl. .................... 74/489; 74/89.15; 74/424.8 NA
[58] Field of Search .................... 74/89.15, 99 A, 74/424.8 NA, 488, 489

[56] References Cited

U.S. PATENT DOCUMENTS 2,788,676  4/1957  Spexarth .................... 74/489
3,213,702  10/1965  Deehan et al. .................... 74/424.8 R
3,404,581  10/1968  Kraus .................... 74/424.8 R

FOREIGN PATENT DOCUMENTS 545902   8/1922  France .................... 74/489
412705   2/1946  France .................... 74/489
68798    1/1958  France .................... 74/489
811918   7/1949  Germany .
1235925  6/1967  United Kingdom .

Primary Examiner—Allan D. Herrmann
Attorney, Agent, or Firm—Larson and Taylor

[57] ABSTRACT

An actuator assembly to produce mechanical power for a function in a bicycle or any other handlebar-steered device, which actuator assembly comprises a twisting part on the handlebar tube, a part to transmit the twisting motion into the tube from its open end, and equipment fitted into the handlebar tube to convert the twisting motion into linear motion. Equipment to convert the twisting motion of twisting part into linear motion of the power transmission device is fitted inside the handlebar tube and the twisting motion is transmitted by means of part which is fitted through the open end of said tube.

8 Claims, 1 Drawing Sheet

ACTUATOR ASSEMBLY IN HANDLE-BAR

The invention relates to an actuator which can be fitted inside a vehicle handle-bar to control a vehicle function. Functions that can be operated by means of a device according to the invention may be, among other things, changing speed, braking, activating clutch and gas.

BACKGROUND OF THE INVENTION

On the basis of novelty research previously known are, among other things, two patent publications, where an actuator mechanism is built in a twist grip. In GB publication 1235925, a complicated construction is presented, where a "nut" on the handle-bar or at its end moves a "screw" to which a wire is fastened. Twisting of a beam, which works as a screw, is prevented either by a mobile slot (FIG. 3) made in the handle-bar end or a separate control sleeve, (FIG. 1) firmly fixed to the handle-bar. The construction includes numerous complicated parts. Inside the handle-bar tube there are parts which move only lengthwise. In DE publication 847 863 a construction is presented, where two wires are operated by means of a mechanism inside a a grip installed fully external on the handle-bar end. Grooves on the grip inner surface move the parts, which are mobile in the grooves, and to which the wires are fastened. Inside the the handle-bar tube there are parts moving only lengthwise.

SUMMARY OF THE INVENTION

The construction according to my invention differs from now available designs in that the motive mechanism and the first section of the wires are hidden in the handle-bar and the twisting motion is taken up to the inside of the handle-bar tube. The invention is characterized in what is presented in the enclosed patent claims.

The twisting motion of the grip is converted into linear motion with a simple and a new kind of a screw/nut combination. This operating principle enables conventional wire utilization.

Utilization of a motive screw in order to produce a linear motion enables construction of functionally ideal control devices, since by changing the screw pitch and handedness, the best sense of steering and ergonomics for all individual use can be provided.

The location of the mechanism inside the tube brings with it numerous advantages:

- it is completely safe from dirt, humidity and mechanical damage for instance at falling
- more elegant and shiny bicycle appearance since the often very big-size gear levers in the handle-bar are completely hidden out of view
- no more risk of injuries by protruding gear levers
- the first length of wire runs inside the handle-bar and is thus not at risk to get entangled in obstacles. The construction according to my design differs clearly from the above referred patent publications in that the actual mechanism contains only two cylindrical parts, a screw and a nut, which are, by means of balls, fitted centrally inside the tube. The construction is decisively more simple and the parts included are also very simple, thanks to which this construction is easy and cheap to manufacture and therefore it will become a mass product of light weight.

BRIEF DESCRIPTION OF DRAWINGS

In the following the invention is presented in detail with reference to the enclosed drawing, where.

DESCRIPTION OF PREFERRED EMBODIMENTS

Figure 1:
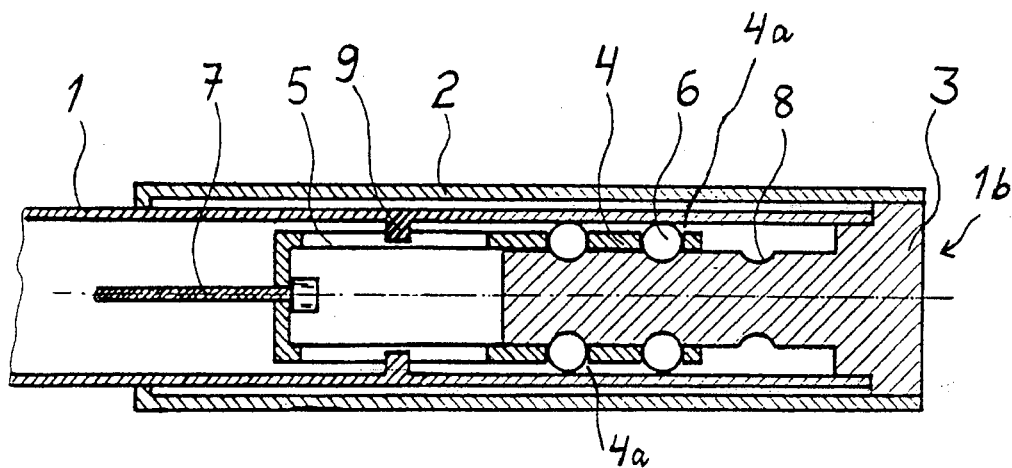
FIG. 1 is a diagrammatic cross-section view of a first embodiment of an actuator of the invention.

FIG. 1 shows an embodiment with wire transmission. Around the handle-bar 1 there is a cylindrical grip 2 that is twisted on the handle-bar. Grip 2 is firmly locked at its outer end to screw element 3, the spiral section 8 of which is located centrally inside the handle-bar. Around the screw element 3 there is a sleevelike nut element 4 with ball holes 4a, which in the illustrated embodiment is in contact with the spiral grooves 8 of screw element 3 by means of balls 6. These balls are in the holes 4a of the nut element sleeve and take support from the inner surface of the handle-bar tube 1. In the sleeve of nut element 4 there are grooves 5 and pins 9 therein prevent nut element 4 from twisting. At twisting part 2, the part 3 is also twisted whereat, depending on the direction of twisting, part 4 moves lengthwise in either direction of the handle-bar. Wire 7, fastened to nut element 4, moves correspondingly. At the wire other end there is a controllable actuator(not shown). The displacement of balls 6 in part 4 can be so arranged that the direction of part 3 spiral groove 8 can be both left-handed and right-handed. This is achieved, for instance, by placing the balls in two or more cross-sectional levels of screw 3.

Figure 2:
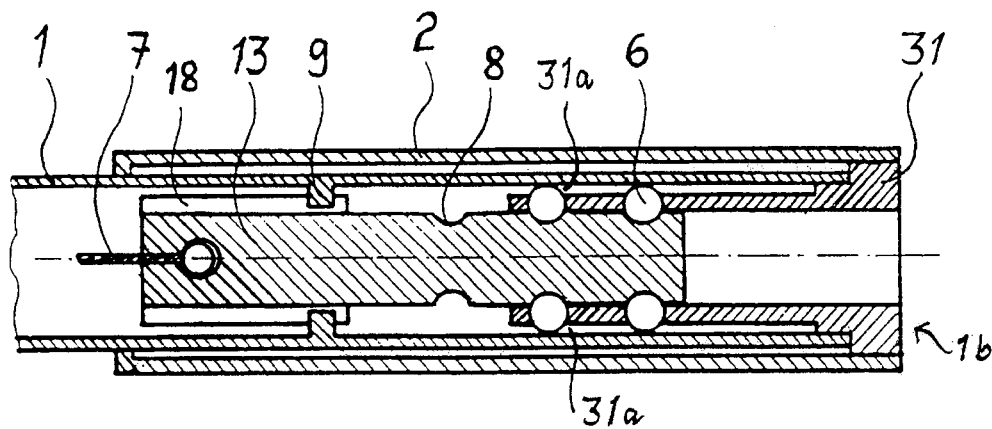
FIG. 2 is a diagrammatic cross-section view of a second embodiment of an actuator of the invention.

FIG. 2 shows an embodiment in which to the twist grip 2 a sleevelike nut element 31 is fastened, in contact with which on the inside is screw element 13. Part 13 and 31 are in contact with spiral grooves 8 by means of suitable balls 6 in holes 3a in nut element 31. At the distal end of screw element 13 a wire 7 is fastened, which runs to an actuator-(not shown). The linear twist of screw element 13 in relation to the handle-bar tube 1 is prevented by pins 9, which fit in the groves 18 on the outer surface of screw element 13.

Figure 3:
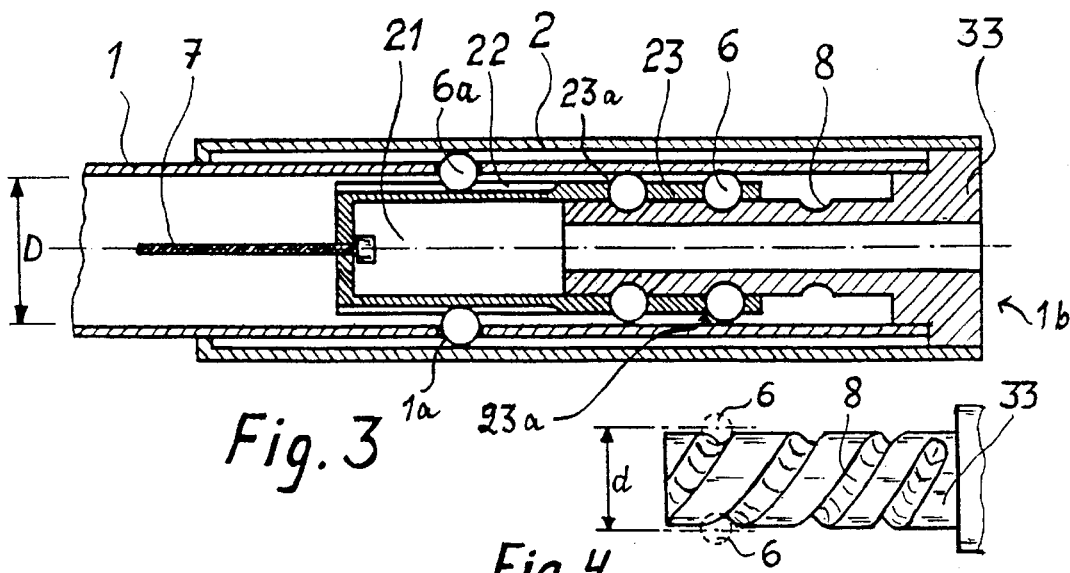
FIG. 3 is a diagrammatic cross-section view of a third embodiment of an actuator of the invention.

FIG. 3 shows a third embodiment in which twisting of sleeve 23 is advantageously prevented by means of balls 6a which are in holes 1a in tube 1 and take support also from part 2. Part 23 has longitudinal grooves 22 in which balls 6 roll and prevent twisting of part 23. Part 33 is hollow which makes installation of wire 7 much easier. Thanks to this construction, the twisting of grip 2 can also be made quite sensitive.

Figure 4:
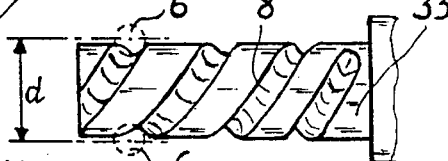
FIG. 4 is a diagrammatic view of a portion of an actuator of the invention showing a ball groove screw.

FIG. 4 shows a screw groove 8 on part 33 surface. In the figure the screw groove spiral diameter d is dimensioned measured from the center of the opposite balls. It is advantageous to get this diameter as big as possible with respect to the inner diameter D of the handle-bar tube, in order to produce a great linear movement by a small twist of grip 2 and so that the pitch of the screw groove need not be very large. A large groove spiral pitch produces great forces and functional disturbances. The ratio d/D should be over 0.5 and it is always possible to build a 0.7 ratio to be functionable in the tube.

Common to all embodiments of the invention is that a linear control movement is provided inside the handle-bar tube by means of a cylindrical screw with a sleevelike nut around it or, vice versa, an element formed by the same and centrally located in the handle-bar tube. The whole device can easily be pushed into the handle bar tube from its open end 1b and its outside grip 2 then pushed onto it.

In the designs according to the figures, instead of wire 7 the motion can be transmitted hydraulically by connecting the parts 4, 13 or 23 to move a piston inside a hydraulic cylinder.

In the above the invention is disclosed referring only to its embodiments presented in the figures. Yet it has not been the intention to restrict the invention in any way solely to these embodiments but other modifications are possible within the limits of the invention concept determined by the enclosed patent claims. The invention is applicable to vehicles with a handle-bar, the handle-bar of an outboard motor and garden machine controls.

What is claimed is:

1. An actuator for producing mechanical power for performing a function in a handlebar-steered device, said handlebar-steered device having a handlebar tube with an open outer end, said actuator comprising:

a tubular twisting grip mounted on an open outer end of a handlebar tube;

a screw element having a spiral ball groove, said screw element being fixedly attached to said twisting grip for rotation therewith, said screw element extending axially within said twisting grip and extending axially within said open outer end of said handle bar tube;

means for converting twisting rotation of the twisting grip into linear motion comprising:

a tubular sleeve element surrounding said screw element, said sleeve element being mounted on said screw element for axial motion within the handlebar tube relative to said screw element;

means preventing rotation of said screw element within said handlebar tube; and balls positioned in holes in said tubular sleeve element, said balls being in rolling contact with the inner surface of the handlebar tube and with the spiral groove of said screw element, said balls centering said screw element in said handlebar tube, whereby twisting said twisting grip causes rotation of said screw element which causes axial motion of said sleeve element in said handlebar tube, said axial motion of said sleeve element providing said mechanical power.

2. An actuator according to claim 1, wherein the screw element, sleeve element and balls are constructed and arranged such that they can be pushed into position within said handlebar tube as a unit.

3. An actuator according to claim 1, wherein said screw element has a right-handed spiral ball groove and left-handed spiral ball groove.

4. An actuator according to claim 1, wherein the diameter of the spiral of said spiral ball groove is at least one half of the inside diameter of said handlebar tube.

5. An actuator for producing mechanical power for performing a function in a handlebar-steered device, said handlebar-steered device having a handlebar tube with an open outer end, said actuator comprising:

a tubular twisting grip mounted on an open outer end of a handlebar tube;

a sleeve element fixedly attached to said twisting grip for rotation therewith, said sleeve element extending axially within said twisting grip and extending axially within said open outer end of said handlebar tube; and means for converting rotational movement of the twisting grip into linear motion comprising:

a screw element having a spiral ball groove, said screw element being mounted for axial motion within said sleeve element, said screw element extending axially within said sleeve element, within said twisting grip, and within the open outer end of said handlebar tube;

means preventing rotation of said screw element relative to said sleeve element; and balls positioned in holes in said sleeve element, said balls being in rolling contact with the inner surface of the handlebar tube and with the spiral ball groove of said screw element, said balls centering said screw element in said handlebar tube, whereby rotation of said twisting grip causes rotation of said sleeve element which causes axial motion of said screw element in said handlebar tube, said axial motion of said screw element providing said mechanical power.

6. An actuator according to claim 5, wherein the screw element, sleeve element and balls are constructed and arranged such that they can be pushed into position within said handlebar tube as a unit.

7. An actuator according to claim 5, wherein said screw element has a right-handed spiral ball groove and left-handed spiral ball groove.

8. An actuator according to claim 5, wherein the diameter of the spiral of said spiral ball groove is at least one half of the inside diameter of said handlebar tube.

* * * * *